Herbert W. Daudt
Mortimer A. Youker
INVENTORS
BY
ATTORNEY.

Patented June 18, 1935

2,005,709

UNITED STATES PATENT OFFICE 2,005,709

PRODUCTION OF ORGANIC FLUORINE COMPOUNDS

Herbert Wilkens Daudt and Mortimer Alexander Youker, Wilmington, Del., assignors to Kinetic Chemicals, Inc., Wilmington, Del., a corporation of Delaware Application October 7, 1933, Serial No. 692,696

11 Claims. (Cl. 260—162)

This invention relates to organic fluorine compounds, more particularly fluorinated acyclic hydrocarbons, and a process for the production thereof.

This application is a continuation-in-part of our co-pending U. S. application Serial No. 483,289, filed September 20, 1930.

Halogen atoms other than fluorine, i. e., chlorine, bromine and iodine, attached to acyclic carbon atoms, may be replaced by fluorine by reaction with various fluorinating agents. Fluorination is sometimes effected in the presence of antimony halides. Antimony halides, particularly pentavalent antimony halides, are normally somewhat volatilized under the conditions of reaction and contaminate gaseous reaction products. Such contamination causes difficulty in purifying the gaseous reaction products which are removed from the reaction zone, particularly on account of the formation of plugs in the lines. Further, if the volatilized antimony halide is not recovered, it represents large economic loss.

Ordinarily, in fluorination processes of the type described, reaction products of varying fluorine content are formed. In addition, the gases from the reaction zone normally contain hydrogen halides and some unconverted raw material. Where it is desired to produce only a single product, as, for example, difluoro-dichloro methane or tetrafluoro-dichloro ethane, it is undesirable to subject all of the reaction products to purification.

It is an object of the present invention to provide a new and improved process for the production of fluorinated acyclic hydrocarbons. A further object is to provide an improvement in fluorination processes of the character described whereby the catalyst volatilized by the reaction is recovered efficiently. Another object is to provide an improvement in fluorination processes of the character described whereby low boiling products may be recovered directly substantially free from higher boiling compounds. A still further object is the provision of an improvement in the production of vaporizable fluorinated compounds by fluorinating liquid halogenated acyclic hydrocarbons in the presence of an antimony fluorinating catalyst, characterized by the fact that the handling of excessive amounts of material in the purifying, condensing and final distillation of the product is avoided. A more specific object is the provision of an improved process for producing difluoro-dichloro methane. Other objects will appear hereinafter.

These objects are accomplished according to the present invention whereby in a fluorination process involving the use of an appreciably volatile fluorinating catalyst, such as antimony halide, and removal from the reaction zone of evolved vapors containing fluorinated compounds, as well as other substances such as, for example, volatilized catalyst and unconverted reactants, the process is characterized by the improvement that the evolved vapors are passed through at least two baths of a substance which may be fluorinated and which has a solvent action on the fluorinating catalyst, said baths being maintained at different temperatures. Portions of the baths or scrubbing liquids, as they are commonly called, may be introduced into the fluorination reaction zone intermittently or continuously, thereby returning volatilized catalyst and incompletely fluorinated compounds. The process may be so operated that all of the compound to be fluorinated is introduced into the reaction zone countercurrent to the issuing gases, that is, after first being used as a scrubbing liquid.

The apparatus in each figure comprises generally a reactor D into which the fluorinating agent and compound to be fluorinated may be introduced directly from storage vessels A and B, respectively. The vapors from reactor D are treated in a scrubber E under such conditions that volatilized catalyst is efficiently removed from the gas stream. The scrubbing liquid is the compound to be fluorinated. This is introduced into scrubber E from storage vessel B and, after being used in scrubbing the reaction gases, is passed from scrubber E into reactor D (in Fig. 1 by way of a calibrated reservoir or weigh tank G).

Figure 1:
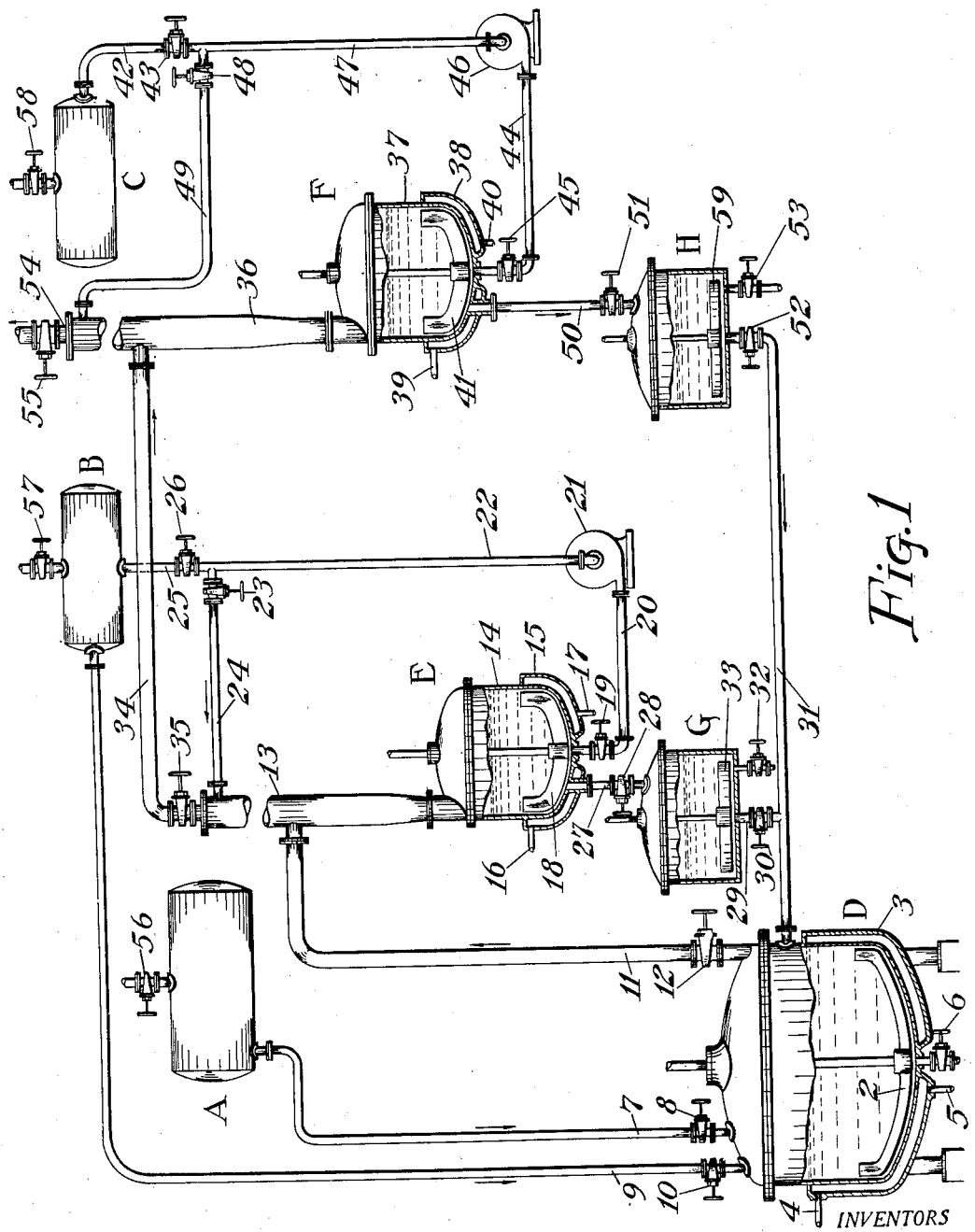
Figure 1 represents one form of apparatus for carrying out the process of invention, characterized by circulation of the scrubbing liquids.

The vapors passing through the scrubbing liquid in E are treated with a second scrubbing liquid in F. This scrubbing liquid is also a compound to be fluorinated, but the physical conditions maintained in scrubber F are different from those maintained in scrubber E. The scrubbing liquid in F is maintained at a temperature sufficiently low to condense most of the higher boiling incompletely fluorinated products in the gas stream. The temperature at which these products may be so completely condensed does not normally promote the efficient removal of antimony catalyst from the gas stream. The scrubbing liquid from scrubber F is also introduced into the reaction zone for fluorination. In the apparatus of Fig. 1 this is effected by first passing the scrubbing liquid from scrubber F into a calibrated reservoir H and then to reactor D.

The gases passing through scrubber F may be conveniently purified in the manner desired. This purification generally includes: (1) a chemical treatment to remove hydrogen halides, for example, by scrubbing with water and/or aqueous solutions of sodium hydroxide, potassium hydroxide, milk of lime or the like; (2) a chemical treatment to remove water vapor, e. g., by treatment with concentrated sulfuric acid, stick caustic or other suitable dehydrating substance. The resultant dry, neutral vapors may be condensed and the fluorinated organic compound or compounds separated by fractional distillation of the condensate, or in any other suitable manner. The treatment of the reaction gases in the second scrubber F is normally sufficient to separate almost all of the unconverted raw material as well as high proportions of the higher boiling fluorinated compounds; but where these substances are present in the final condensate, they may be used again in the process, e. g., by direct introduction into the reaction zone in reactor D or by introduction into scrubbers E or F.

The invention will be more fully understood by reference to the following detailed description. For convenience, the process is described in connection with specific substances, namely, hydrogen fluoride (the fluorinating agent), carbon tetrachloride (the compound to be fluorinated) and an antimony fluorochloride (the catalyst).

With reference to Figure 1, the reactor D, as illustrated, is provided with a stirring or agitating device 2 operated by a suitable mechanical means, such as a motor (not shown). A jacket 3, having an inlet 4 and an outlet 5 for a heat transfer medium, is provided to maintain the desired reaction temperature. A bottom valved outlet 6 is provided to remove the contents of the reactor D.

In practising the invention, the antimony halide catalyst is charged into the reactor and heated to the desired reaction temperature by passing a heating fluid, for example, steam, into the jacket 3, as indicated. When the desired reaction temperature has been attained (say 45° C. to 95° C.), gaseous hydrogen fluoride from storage vessel A is introduced into reactor D through line 7 and valve 8. Simultaneously, carbon tetrachloride is introduced into reactor D from storage vessel B through line 9 and valve 10.

As a result of the reaction, the carbon tetrachloride has a part of its chlorine replaced by fluorine. The reaction normally produces some of each of the compounds $CCl_3F$ and $CCl_2F_2$. The proportions of these substances will depend upon the specific operating conditions. The reaction also produces hydrogen chloride. By a proper regulation of the temperature of the reaction, the time of the reaction or contact of the materials, relative proportions of the ingredients, pressures, etc., the production of the desired compounds is maintained at a maximum.

The reaction gases containing substances of the type enumerated and some unconverted hydrogen fluoride and carbon tetrachloride pass through line 11 and valve 12 into scrubber E. Scrubber E, as illustrated in the drawings, is of the circulating type, comprising a column 13, into which the gases in line 11 are introduced, and a reservoir for the scrubbing liquid 14. Reservoir 14 is provided with a jacket 15 having an inlet 16 and an outlet 17 for a heat transfer medium. A suitable agitating device, such as illustrated at 18, operated by a motor (not shown) or by any other convenient method, facilitates contact of the scrubbing liquid with the reaction gases and also serves to prevent clogging of the lines by solid particles which may be removed from the gas stream. The liquid in reservoir 14 is re-circulated through tower 13 in countercurrent flow with the reaction gases from line 11. Re-circulation is effected by way of valve 19, line 20, pump 21, line 22, valve 23 and line 24. Fresh scrubbing liquid is added to the system from storage vessel B by way of line 25 and valve 26. The temperature of the scrubbing liquid in scrubber E is maintained relatively high in order to remove antimony halides from the reaction gases. In addition to the removal of antimony halides, scrubber E also removes some of the unconverted carbon tetrachloride from the gas stream. In general, the temperatures preferably employed are too high to effect removal of the desired proportions of the higher boiling fluorinated products.

The scrubbing liquid contained in scrubber E, when continuous operation is established, is introduced into reactor D. This returns the antimony catalyst to the reaction zone. The introduction of the scrubbing liquid into reactor D from scrubber E is effected by passing it through line 27, controlled by valve 28, into a calibrated reservoir G and then through line 29, valve 30 and line 31, in the order named. Vessel G is provided with a valved bottom outlet 32 and an agitator 33. The proportions of the scrubbing liquid introduced into reactor D from vessel G are preferably regulated according to the rate of introduction of hydrogen fluoride into reactor D and the rate of fluorination. As the scrubbing liquid is withdrawn from scrubber G fresh carbon tetrachloride from storage vessel B is introduced into scrubber E through line 25 controlled by valve 26.

The exit gases from the top of column 13 of scrubber E enter line 34 controlled by valve 35 and are thereby introduced into the second scrubber illustrated at F. Scrubber F is similar in construction to scrubber E comprising a column 36 into which the gases from line 34 are introduced and a reservoir 37 for the scrubbing liquid. Reservoir 37 is provided with a jacket 38 having an inlet 39 and an outlet 40 for a heat transfer medium. An agitating device 41 is also provided. The scrubbing liquid which may be fluoro-trichloro methane, carbon tetrachloride or both, is introduced into scrubber F from storage vessel C through line 42 and valve 43. The scrubbing liquid is re-circulated from reservoir 37 to column 36 by way of line 44, valve 45, pump 46, line 47, valve 48 and line 49. The temperature maintained in scrubber F is normally relatively low in comparison to the temperature of scrubber E. At the relatively low temperatures employed in scrubber F, higher boiling fluorinated products and unconverted carbon tetrachloride are removed from the gas stream.

At intervals or continuously, the liquid in reservoir 37 is introduced into a calibrated reservoir or weigh tank H through line 50 and valve 51. At the same time, fresh scrubbing liquid is added from storage vessel C. As the fluorination in reactor D progresses the liquid in reservoir H is added thereto in regulated proportions through line 31, controlled by valve 52. Reservoir H is provided with a valved bottom outlet 53 for drainage and an agitator 59. When continuous operation has been established, valve 10 is preferably kept closed and most of the carbon tetrachloride or fluoro-trichloro methane to be fluorinated is preferably introduced from G or H or both into the reaction zone after first being contacted with the reaction gases in scrubbers E and F.

The gases which pass through scrubber F are removed through line 54, controlled by valve 55, and may be further purified in any suitable manner, for example, by passing them through a dilute solution of sodium hydroxide and then concentrated sulfuric acid, as previously described.

In carrying out the process of the invention, it will be recognized that various modifications may be made in the exact method of procedure. Thus, the calibrated reservoirs or weigh tanks G and H may be omitted from the construction of the apparatus, or the process may be operated by other means of control in returning the scrubbing liquids to the reaction zone. Lack of control may result in a serious loss of efficiency during periods of operation which are not uniform because of other operation difficulties. The use of some such means of control as shown has, therefore, given very desirable results. Agitation of the scrubbing liquids, especially in E and F, is highly desirable in order to prevent stoppage by the presence of suspended materials. Such stoppages may cause considerable annoyance because of the attending interruptions in operation and the handling of corrosive and toxic materials. While not shown as such, lines 7, 9 and 31 are preferably standpipes, that is, pipes extending to the bottom of the reactor D. Columns 13 and 36 are preferably packed with some inert material such as that used in the construction of the equipment. The lines 11 and 34 which deliver the gases to be purified to columns 13 and 36, respectively, preferably enter the columns near the bottom, for instance, at points about one-third of the distance from the bottom to the top of each column. The columns are shown with parts broken away in order to facilitate the drawings. The storage vessels A, B, and C may be filled through valved inlets 56, 57 and 58.

Figure 2:
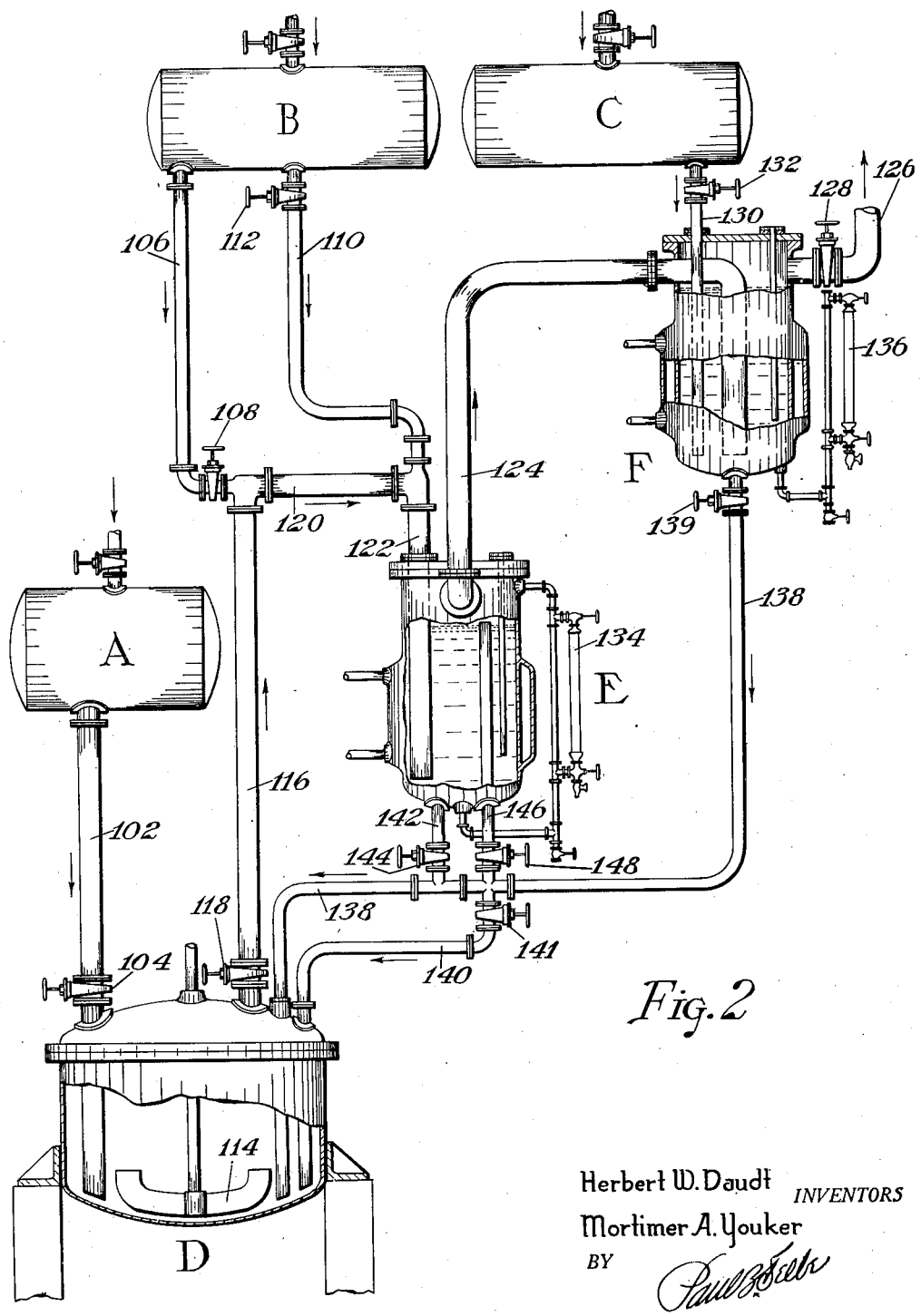
Figure 2 represents another form of apparatus for carrying out the process of the invention in which the scrubbers are non-circulating.

When the process of the invention is carried out in an apparatus such as described in Fig. 2, the hydrogen fluoride (the fluorinating agent) is introduced into reactor D from reservoir A through line 102 and valve 104. Carbon tetrachloride (the compound to be fluorinated) is introduced into the system from vessel B through lines 106 and 110 controlled by valves 108 and 112, respectively. An agitator 114 is provided in reactor D.

The reaction gases pass upwards through line 116 controlled by valve 118, through lines 120 and 122 into scrubber E. After passing through the scrubbing liquid in E, they enter line 124 and pass to scrubber F. The gases passing through the scrubbing liquid in F are withdrawn through line 126 controlled by valve 128.

The compositions of the scrubbing liquids in E and F may be similar to those given in connection with the description of Fig. 1. Scrubbing liquid for scrubber F may be introduced from reservoir C through line 130 controlled by valve 132. Suitable liquid level indicating devices 134 and 136 are provided on scrubbers E and F, respectively.

As the fluorination reaction in reactor D proceeds, the scrubbing liquids from E and F are introduced into reactor D either continuously or intermittently, the introduction being made through lines 138 and/or 140. Line 138 is provided with a valve 139 while line 140 is provided with a valve 141. The liquid in scrubber E may be introduced into line 138 through line 142 controlled by valve 144 or overflow line 146 controlled by valve 148. Line 146 connects also with line 140.

Portions of the apparatus which come into contact with hydrogen halides during the process have usually been constructed of or lined with some corrosion-resistant material such as copper, Monel metal, lead, steel, chromium steels and iron.

The invention will be further understood, particularly as regards proportions of materials, temperatures and pressures, from a consideration of the following examples, in which the parts are by weight.

*Example I*

A mixture of 75 parts of antimony pentachloride, 10 parts of antimony trichloride and 10 parts of chloroform, was placed in the reactor of a set-up similar in principle to that illustrated in Fig. 2 of the drawings. The temperature of the mixture was maintained at about 75° C., and substantially anhydrous hydrogen fluoride and chloroform were added to the reaction zone at the rate of about 10 parts of hydrogen fluoride per hour and 70 parts of chloroform per hour. The introduction of chloroform was effected by first introducing it into scrubbers E and F. The first scrubber E was maintained at a temperature of about 30° C. to about 40° C. and the second scrubber F was maintained at a temperature of about 10° C. to about 15° C. The reaction gases, after passing through scrubbers E and F, were successively scrubbed with dilute solutions of sodium hydroxide and concentrated sulfuric acid in the order named. The sodium hydroxide and sulfuric acid scrubbers were operated at a temperature of about 25° C. The product, condensed at about −50° C., consisted of a mixture of difluoro-chloro-methane and fluoro-dichloro-methane which contained a small amount of unconsumed chloroform. When a sample portion of the vapors from E were purified from the acids, dried and then condensed, the product was found to contain much greater proportions of $CHCl_3$ and of $CHFCl_2$ and smaller proportions of $CHF_2Cl$ than the above product. The yield of fluorinated product was about 80% to 85%. The various components of the condensate were separated by fractional distillation. Difluoro-chloro-methane boils at about −41° C., and fluoro-dichloro-methane at about 8.7° C., under atmospheric pressure.

*Example II*

Five hundred parts of gaseous, substantially dry, hydrogen fluoride were passed rapidly and steadily into a reactor, such as illustrated at D in Fig. 1 of the drawings, over a period of twenty-five hours. The reactor contained 600 parts of antimony pentachloride which was maintained at a temperature of about 60° C. During this time 1925 parts of carbon tetrachloride were run into the reactor D from reservoirs B and C by the way of scrubbers E and F and weigh tanks G and H. The carbon tetrachloride in scrubber E was maintained at a temperature of about +30° C. and the second scrubbing liquid, contained in scrubber F, was maintained at a temperature of about −10° C. The reaction gases, after passing through scrubber F, were passed successively through caustic and sulfuric acid scrubbers operated at a temperature of about 25° C. to about 30° C. The product was then condensed.

The yield of fluorinated products was about 90% to about 95%. The condensate boiled at about —20° C. and comprised substantially 75% difluoro-dichloro methane and 25% fluoro-trichloro methane. Only small amounts of carbon tetrachloride were present. No stoppages in the return lines from the scrubbers were encountered.

*Example III*

An apparatus similar in principle to that described in Fig. 1 of the drawings was used. Reactor D was charged with approximately 300 parts of an antimony fluoro-chloride catalyst, having a fluorine content of about 6% to about 7%, and hydrogen fluoride was introduced into reactor D at the rate of about 8.75 parts per hour. Scrubbing liquid comprising substantially carbon tetrachloride was simultaneously introduced into D from weigh tanks G and H at the rate of about 38.2 parts per hour.

When the supply of the scrubbing liquid in G and H was nearly exhausted, the feed of this material to reactor D was temporarily interrupted while vessels G and H were being refilled with scrubbing liquid from scrubbers E and F. Subsequently, while the scrubbing liquid was being introduced into the catalyst at the rate of 38.2 parts per hour, fresh carbon tetrachloride was introduced into scrubbers E and F from storage vessels B and C at the same rate.

The temperature of scrubber E was maintained at about +30° C. and the temperature of scrubber F at about —10° C. The vapors passing through scrubber F were further purified by treatment with an aqueous solution of sodium hydroxide and concentrated sulfuric acid at temperatures of about 25° C. to about 30° C., and the resultant product was condensed. The composition of the product was essentially the same as the product of Example II. Difluoro-dichloro methane was recovered in good yield.

*Example IV*

An apparatus similar to that described with reference to Fig. 1 of the drawings was used. About 880 parts of anhydrous antimony trichloride were charged into reactor D and treated with liquid chlorine at a temperature of about 100° C. and a pressure of about 100 pounds per square inch (gauge) until approximately 142 parts of chlorine had been added. Liquid hydrogen fluoride was then introduced into reactor D at the rate of about 8 parts per hour under a pressure of 75 pounds per square inch, the temperature still being maintained at about 100° C. When 140 parts of hydrogen fluoride had been added, additional hydrogen fluoride was introduced at the rate of about 4 parts per hour until a total of about 250 parts had been added.

The temperature of the catalyst in reactor D was then raised to about 160° C. to 165° C. Hydrogen fluoride from storage vessel A and perchloro-ethylene from storage vessel B, together with chlorine, were then introduced into the catalyst at the following hourly rates:

|  | Parts |
|---|---|
| Hydrogen fluoride | 3.0 |
| Chlorine | 2.5 |
| Perchloro-ethylene | 5.9 |

The gases from the reaction zone were introduced into scrubber E which was maintained at a temperature of about 90° C. to about 100° C. The scrubbing liquid in scrubber E was initially perchloro-ethylene from storage vessel B.

The gases from scrubber E passed to scrubber F which was maintained at a temperature of about 10° C. to about 15° C. The scrubbing liquid in scrubber F was initially perchloro-ethylene.

In the early stages of operation the fluorinated product in the reaction gases was largely trifluoro-trichloro-ethane, most of which condensed in scrubber F. Unconverted perchloro-ethylene in the reaction gases was removed in both scrubbers E and F. The relatively high temperature maintained in scrubber E enabled the efficient removal of substantially all of the volatilized antimony compounds in the reaction gases.

As the reaction proceeded, the direct introduction of perchloro-ethylene from reservoir B was discontinued and instead the scrubbing liquids from scrubbers E and F were introduced into the reaction zone through the weigh tanks G and H. As the scrubbing liquids were exhausted, they were replenished with perchloro-ethylene and trifluoro-trichloro-ethane. The amount of these liquids introduced into the catalyst was gradually increased up to about 40 to 50 parts per hour. Tetrafluoro-dichloro-ethane was formed in increasing quantities until the rate of production finally reached about 4 parts per hour.

The gases which passed through scrubber F were further purified by scrubbing with water, a dilute solute of sodium hydroxide and concentrated sulfuric acid in the order named at temperatures of about 50° C. to about 55° C. The resultant product was condensed and the condensate fractionated. Approximately 33 parts of trifluoro-trichloro-ethane were produced with every 100 parts of tetrafluoro-dichloro-ethane.

The trifluoro-trichloro-ethane was returned to the reaction zone, being introduced into scrubber F by way of reservoir C. After continuous operation had been established, the hourly introduction of raw materials into the system was:

|  | Parts |
|---|---|
| Chlorine | 2.0 |
| Perchloro-ethylene | 4.75 |
| Hydrogen fluoride | 2.5 |
| Trifluoro-trichloro-ethane | 1.25 |

It will be understood that the invention is not limited by the foregoing examples. In general, it is applicable to the treatment of reaction gases containing fluorinated acyclic hydrocarbons prepared by a fluorination reaction involving the use of a volatile catalyst, such as an antimony halide. The fluorinating agent may be hydrogen fluoride or any other volatile fluorinating agent which is effective in the presence of a catalyst.

The compounds which are used as scrubbing liquids for the reaction gases and which are subsequently fluorinated in accordance with the invention are preferably liquid acyclic halogen compounds containing at least one halogen atom other than fluorine. Included among such compounds may be mentioned carbon tetrachloride, chloroform, tetrachloro-ethane, perchloro-ethylene, fluoro-trichloro-methane, trifluoro-trichloro-ethane, trichloro-ethylene, tribrom-ethane and the like. Where the acyclic halogen compound to be fluorinated is a solid under the conditions of scrubbing, it may be dissolved in a suitable solvent, which is inert under the conditions of reaction, or may be further fluorinated. Thus, hexachloro-ethane may be used as a scrubbing liquid under the conditions of Example IV when dissolved in an incompletely fluorinated acyclic hydrocarbon such as trifluoro-trichloro-ethane.

The catalyst used in the fluorination is preferably an antimony halide containing a composition represented empirically by

in which Hal represents a halogen other than fluorine, and $x$ represents a positive value less than 5. Especially desirable results have been obtained in the application of the invention to the production of fluoro-chloro acyclic hydrocarbon derivatives by the fluorination of chlorinated acyclic hydrocarbon derivatives with hydrogen fluoride in the presence of an antimony fluorochloride. The antimony catalyst is preferably a mixture of pentavalent and trivalent antimony halides. In general, the presence of antimony trihalides is advantageous in preventing dissociation of the catalyst.

As indicated by Example IV, a free halogen may be present or may be added to the reaction zone during the fluorination. It will be recognized that the free halogen used should correspond to the type of product desired; that is, in the production of fluoro-chloro acyclic hydrocarbon derivatives, chlorine may be added to the reaction zone, while in the production of fluorobromo acyclic hydrocarbon derivatives, bromine may be added to the reaction zone.

The temperature of the scrubbing liquid employed to remove volatile catalyst from the reaction gases is subject to some variation, depending largely upon the specific compound being fluorinated and the products derived therefrom. Generally speaking, the conditions of temperature and pressure for the removal of volatilized antimony catalyst should be so regulated that the scrubber liquid is maintained in liquid form and that it readily dissolves antimony halides. Where the scrubber liquid is chloroform, or carbon tetrachloride, temperatures within the range of about 25° C. to 45° C. are preferably used. Where super-atmospheric pressures are used, it is desirable to maintain higher temperatures in this step of the process. Higher temperatures may also be maintained where higher boiling acyclic halogen derivatives are fluorinated. Thus, in the fluorination of compounds such as hexachloroethane, tetrachloro ethane and trichloro ethylene, good results have been obtained in the removal of antimony catalyst from the gas stream under pressure by scrubbing with these acyclic halogen compounds at temperatures within the range of about 90° C. to about 100° C. (cf. Example IV).

The temperature of the scrubber liquid which is primarily used to remove unconverted organic raw materials and higher boiling fluorinated compounds from the reaction gases may vary within relatively wide limits, depending largely upon the boiling points of these compounds under the specific conditions of temperature and pressure employed and the purity of the product desired. In general, the temperature conditions described in the examples have given good results for the specific fluorination reactions involved. For the production of difluoro-dichloro methane from carbon tetrachloride, temperatures below about 0° C. are preferably used in this step.

It is recognized that the compositions of the scrubbing liquids after the operation is under way are not the same as those of the original liquids. Also, the compositions of the scrubbing liquids vary with temperature.

The exact method of procedure used in practising the invention may vary widely. In general, it has been found desirable to treat the reaction gases with the heated scrubbing liquid first and then the cooler scrubbing liquid. Instead of two scrubbing liquids, a succession of a larger number of baths may be placed in series, the temperature of each bath being so regulated that it is lower than the temperature of the preceding bath. According to this method of procedure, substantially all of the unconverted organic raw materials and a very high proportion of the partially fluorinated compounds present in the reaction gases, as well as volatilized catalyst, may be removed prior to further purifying, condensing and finally distilling the product.

The invention provides a valuable improvement in processes for the production of fluorinated acyclic hydrocarbons of the character described. The efficient removal of the antimony catalyst from the reaction gases and its return to the reaction vessel not only represents a considerable economic benefit, but also greatly facilitates the operation of the process in the prevention of antimony plugs in various portions of the system.

Throughout the specification and claims, it will be understood that by the expression "incompletely fluorinated" it is intended to include unconverted acyclic halogen compounds containing no fluorine as well as partially fluorinated compounds.

As many apparently widely different embodiments of this invention may be made without departing from the spirit and scope thereof, it is to be understood that we do not limit ourselves to the specific embodiments thereof except as defined in the following claims.

We claim:

1. In a process of producing organic fluorine compounds involving a fluorination in the presence of a volatile antimony fluorinating catalyst and removal from the reaction zone of evolved vapors containing fluorinated compounds and volatilized catalyst as well as other substances, the step which comprises passing the evolved vapors through at least two scrubbing baths in series of a halogenated acyclic hydrocarbon, the temperature of each bath being lower than that of the preceding one.

2. In a process of producing organic fluorine compounds involving a fluorination in the presence of a volatile antimony halide and removal from the reaction zone of evolved vapors containing fluorinated compounds and volatilized antimony halide as well as other substances, the step which comprises passing the evolved vapors through at least two scrubbing baths in series of a halogenated acyclic hydrocarbon, the temperature of each bath being lower than that of the preceding one.

3. In a process of producing fluorinated acyclic hydrocarbons involving fluorination of a halogenated acyclic hydrocarbon containing at least one halogen other than fluorine in the presence of an antimony halide and removal from the reaction zone of evolved vapors containing fluorinated compounds and volatilized antimony halide as well as other substances, the steps which comprise passing the evolved vapors through a scrubbing bath containing a halogenated acyclic hydrocarbon which is the same as that being fluorinated, subsequently passing the resultant gases through at least one other scrubbing bath of the halogenated acyclic hydrocarbon raw material maintained at a lower temperature than the preceding bath and at a temperature sufficiently low to condense incompletely fluorinated compounds, and introducing the scrubbing baths into the fluorination reaction zone.

4. The process of claim 1 in which the material contained in the scrubbing baths is introduced into the reaction zone.

5. The process of claim 2 in which the material contained in the scrubbing baths is introduced into the reaction zone.

6. The process of claim 3 in which the halogenated acyclic hydrocarbon raw material is carbon tetrachloride.

7. In a process of producing difluoro-dichloro methane involving fluorination of carbon tetrachloride with substantially anhydrous hydrogen fluoride in the presence of an antimony fluorochloride, the step which comprises passing the vapors evolved from the reaction zone through a bath containing principally carbon tetrachloride maintained at a temperature of about 30° C. to about 40° C., then passing the resultant vapors through a second bath containing principally carbon tetrachloride and fluoro-trichloro methane maintained at a temperature below about 0° C., and introducing said baths into the fluorination reaction zone.

8. In a process of producing fluorinated acyclic hydrocarbons involving fluorination of a halogenated acyclic hydrocarbon containing at least one halogen atom other than fluorine in the presence of an antimony halide and removal from the reaction zone of evolved vapors containing fluorinated compounds and volatilized atimony halide, the step which comprises passing the evolved vapors through a liquid halogenated acyclic hydrocarbon heated substantially above room temperature.

9. In a process of producing fluorinated acyclic hydrocarbons involving fluorination of a halogenated acyclic hydrocarbon containing at least one halogen atom other than fluorine in the presence of an antimony halide and removal from the reaction zone of evolved vapors containing fluorinated compounds and volatilized antimony halide, the step which comprises passing the evolved vapors through a liquid halogenated acyclic hydrocarbon heated substantially above room temperature under superatmospheric pressure.

10. In a process of producing fluorinated ethanes involving fluorination of perchloroethylene with substantially anhydrous hydrogen fluoride in the presence of an antimony fluorochloride, the step which comprises passing the vapors evolved from the reaction zone through a bath containing principally perchloroethylene maintained at a temperature of about 90° to about 100° C.

11. In a process of producing fluorinated ethanes involving fluorination of perchloroethylene with substantially anhydrous hydrogen fluoride in the presence of an antimony fluorochloride, the step which comprises passing the vapors evolved from the reaction zone through a bath containing principally perchloroethylene maintained at a temperature of about 90° to about 100° C. under superatmospheric pressure.

HERBERT WILKENS DAUDT.
MORTIMER ALEXANDER YOUKER.